United States Patent
Fu et al.

(10) Patent No.: US 12,341,861 B2
(45) Date of Patent: Jun. 24, 2025

(54) DYNAMIC HORIZONTAL AUTOSCALING FOR MULTI-TENANT SERVICE

(71) Applicant: International Business Machines Corporation, Armonk, NY (US)

(72) Inventors: Rong Fu, Zhejiang (CN); Jian Dong Yin, Beijing (CN); Hao Sheng, Zhejiang (CN); Chuan Qing Yu, Beijing (CN); Wen Wang, Beijing (CN); Kang Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 18/066,339

(22) Filed: Dec. 15, 2022

(65) Prior Publication Data

US 2024/0205305 A1 Jun. 20, 2024

(51) Int. Cl.
*H04L 67/63* (2022.01)
*H04L 43/16* (2022.01)
*H04L 67/61* (2022.01)

(52) U.S. Cl.
CPC .............. *H04L 67/63* (2022.05); *H04L 43/16* (2013.01); *H04L 67/61* (2022.05)

(58) Field of Classification Search
CPC .......... H04L 67/63; H04L 67/61; H04L 43/16
See application file for complete search history.

(56) References Cited

U.S. PATENT DOCUMENTS

| | | | |
|---|---|---|---|
| 9,300,552 B2 | 3/2016 | Dube et al. | |
| 10,715,388 B2 | 7/2020 | Fildebrandt et al. | |
| 11,411,886 B1 | 8/2022 | Bhandari et al. | |
| 2014/0075032 A1 | 3/2014 | Vasudevan et al. | |
| 2019/0042322 A1* | 2/2019 | Calhoun | G06F 9/505 |
| 2021/0318913 A1* | 10/2021 | Moyer | G06F 9/5072 |
| 2021/0319781 A1* | 10/2021 | Gullo | G06F 40/166 |

OTHER PUBLICATIONS

Nguyen et al., "Horizontal Pod Autoscaling in Kubernetes for Elastic Container Orchestration," Jul. 21, 2020. (Year: 2020).*

(Continued)

*Primary Examiner* — Andrew C Georgandellis
(74) *Attorney, Agent, or Firm* — Cantor Colburn LLP; Joseph P. Curcuru (57) ABSTRACT

Embodiments relate to dynamic horizontal autoscaling for a multi-tenant service. According to an aspect, a computer-implemented method includes configuring a network computing element to route a plurality of requests from two or more clients to a service in a containerized-networked system. A horizontal service-level autoscaler monitors one or more aspects of the requests to the service from the two or more clients. A new pod including a set of running containers with shared resources in the containerized-networked system is created based at least in part on the horizontal service-level autoscaler determining that at least one of the one or more aspects of the requests exceeds a threshold. A new service mapping is created to accept subsequent requests from one of the two or more clients that triggered creation of the new pod.

12 Claims, 6 Drawing Sheets

(56) References Cited

OTHER PUBLICATIONS

Azure Service Fabric Auto Scaling Services and Containters—Azure Service Fabric "Introduction to Auto Scaling" retrieved from: https://docs.microsoft.com/en-us/azure/service-fabric/service-fabric-cluster-resource-manager-autoscaling, retrieved Sep. 15, 2022, 8 pages.

Horizontal Pod Autoscaling, Kubernetes API resource, last modified Jun. 10, 2022, 6 pages.

Kubernetes Engine Documentation, "Best practices for enterprise multi-tenancy", retrieved from: https://cloud.google.com/kubernetes-engine/docs/best-practices/enterprise-multitenancy; retrieved on Sep. 15, 2022, 23 pages.

Nguyen et al., "Horizontal Pod Autoscaling in Kubernetes for Elastic Container Orchestration", MDPI, Sensors, 2020, 20, 4621, 18 pages.

Pata, et al., "Dynamic Request Routing in Multi-tenant Systems with Amazon CloudFront", AWS Architecture Blog, retrieved from: https://aws.amazon.com/blogs/architecture/dynamic-request-routing-in-multi-tenant-systems-with-amazon-cloudfront/, retrieved on Sep. 15, 2022, 4 pages.

Sarathy, V., "Autoscaling Amazon EKS services based on custom Prometheus metrics using CloudWatch Container Insights", Oct. 8, 2020, retrieved Sep. 15, 2022, 13 pages.

Singh, S., "Connection-Based Auto-Scaling to Isolate Individual Operations into Separate Fault Domains", Publication Date: May 11, 2020, IPCOM000262191D, 2 pages.

* cited by examiner

DYNAMIC HORIZONTAL AUTOSCALING FOR MULTI-TENANT SERVICE

BACKGROUND

The present invention generally relates to programmable computers, and more specifically, to computer-implemented methods, computer systems, and computer program products configured and arranged to perform dynamic horizontal autoscaling for a multi-tenant service.

A container platform provides services to organize a variety of software products, including web storage, data transfer, backup and replication, among others. For example, a container platform can include a family of containerization software products in different environments to allow users to monitor container resources and container health, manage users, work with operators, etc. Such a container platform can include a control plane of multiple control plane components, including a persistence store, an application programming interface (API), a controller manager, among others. These control plane components are powered continuously and stay alive regardless of actual workload, resulting in inefficiencies in power and resource utilization.

SUMMARY

Embodiments of the present invention are directed to computer-implemented methods for dynamic horizontal autoscaling for a multi-tenant service. A non-limiting example computer-implemented method includes configuring a network computing element to route a plurality of requests from two or more clients to a service in a containerized-networked system. A horizontal service-level autoscaler monitors one or more aspects of the requests to the service from the two or more clients. A new pod including a set of running containers with shared resources in the containerized-networked system is created based at least in part on the horizontal service-level autoscaler determining that at least one of the one or more aspects of the requests exceeds a threshold. A new service mapping is created to accept subsequent requests from one of the two or more clients that triggered creation of the new pod.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Various technical benefits and technical solutions are provided by techniques, processes, devices, and systems for dynamic horizontal autoscaling for a multi-tenant service to improve resource utilization efficiency. A multi-tenant service refers to a service that can be used by multiple clients. Resource contention can be avoided for shared resources with connection constraints using dynamic horizontal autoscaling for a multi-tenant service. As one example, a containerized-networked system can organize resources for shared use as pods. A pod is a group of one or more containers, with shared storage and network resources and can include a specification for how to run the containers. Pod contents are typically co-located and co-scheduled to run in a shared context. Pods can be deployed in a cloud context with a same logical host or a non-cloud context, such as a same physical or virtual machine. A container can include a portable executable image of software with dependencies.

Horizontal scaling can be used to add or subtract resources as demand changes. External dependencies, such as database connections and network connections, can result in excessive consumption of resources and potential instability in services as horizontal scaling is performed. For example, a service may interface with multiple pods, and each pod can access external sources, such as a database. Each pod can maintain several data source connection pools. For instance, n clients may result in each pod having n data source connection pools. A data source connection pool is typically defined with a minimum and maximum number of connections. A further constraint can be a maximum number of concurrent requests supported. Different clients using a same multi-tenant service can have different connection requirements with different numbers of concurrent requests. Different clients may also have different resource needs, such as memory usage and processing resource usage and other setting differences. Thus, a maximum number of concurrent connections which can be supported in a database may be different between clients.

One approach to horizontal scaling can use replica sets that replicate pods as demand increases with connected clients being provided with resources through all of the replicated pods. This simple approach can work well for configurations with balanced demand by each client. However, where multiple clients use a service to interact with external databases or other external resources with different scale connected through the set of pods, the underlying resources may not be used efficiently or can reach potentially unstable conditions. For example, a first client of a service may interact with a first database having a maximum of 100 connections and up to 200 concurrent requests supported, and a second client of the service may interact with a second database having a maximum of 200 connections and up to 500 concurrent requests supported. Each pod of a pod set of the service may have a data source connection pool supporting a minimum of 10 and a maximum of 40 connections. If horizontal scaling results in a three pod set and all of the pods are used to connect with the first database, it is possible that the number of connections that could be attempted through the pods (e.g., up to 120) could exceed the maximum number of connections supported by the first database while not getting close to the maximum number of connections supported by the second database. Thus, such a scenario can result in potential instability for some resources and under utilization of other resources.

According to aspects of the present disclosure, a method for dynamic horizontal autoscaling for a multi-tenant service is provided. Horizontal auto scaling at a service level can be performed through a network computing element that may support communication through hypertext transfer protocol (HTTP) or HTTP secure (HTTPS), for example. The network computing element can have a corresponding name defined through a domain name server for multiple clients to access via one or more addresses and ports. The network computing element can be a gateway that translates network interactions between clients and system components, such as services. Routing rules of the network computing element can be dynamically updated to route client requests to variations of a service each having a service name variation that represents the same service to access resources with client-specific pod scaling. Some service variations can map to a shared pod used by multiple services and other mapping can include dedicated pods for use by a single client. Partial sharing of pods can include sharing by multiple clients and fewer than all clients. This separation and horizontal scaling is not visible to the clients. A horizontal service-level autoscaler can monitor one or more aspects of requests to the service from two or more clients and scale service mapping and pods horizontally to align with the number of clients and client requests. Thus, rather than fully replicating pods to scale horizontally, the customized scaling can balance resource utilization with respect to imbalanced client requests to the service.

Figure 1:
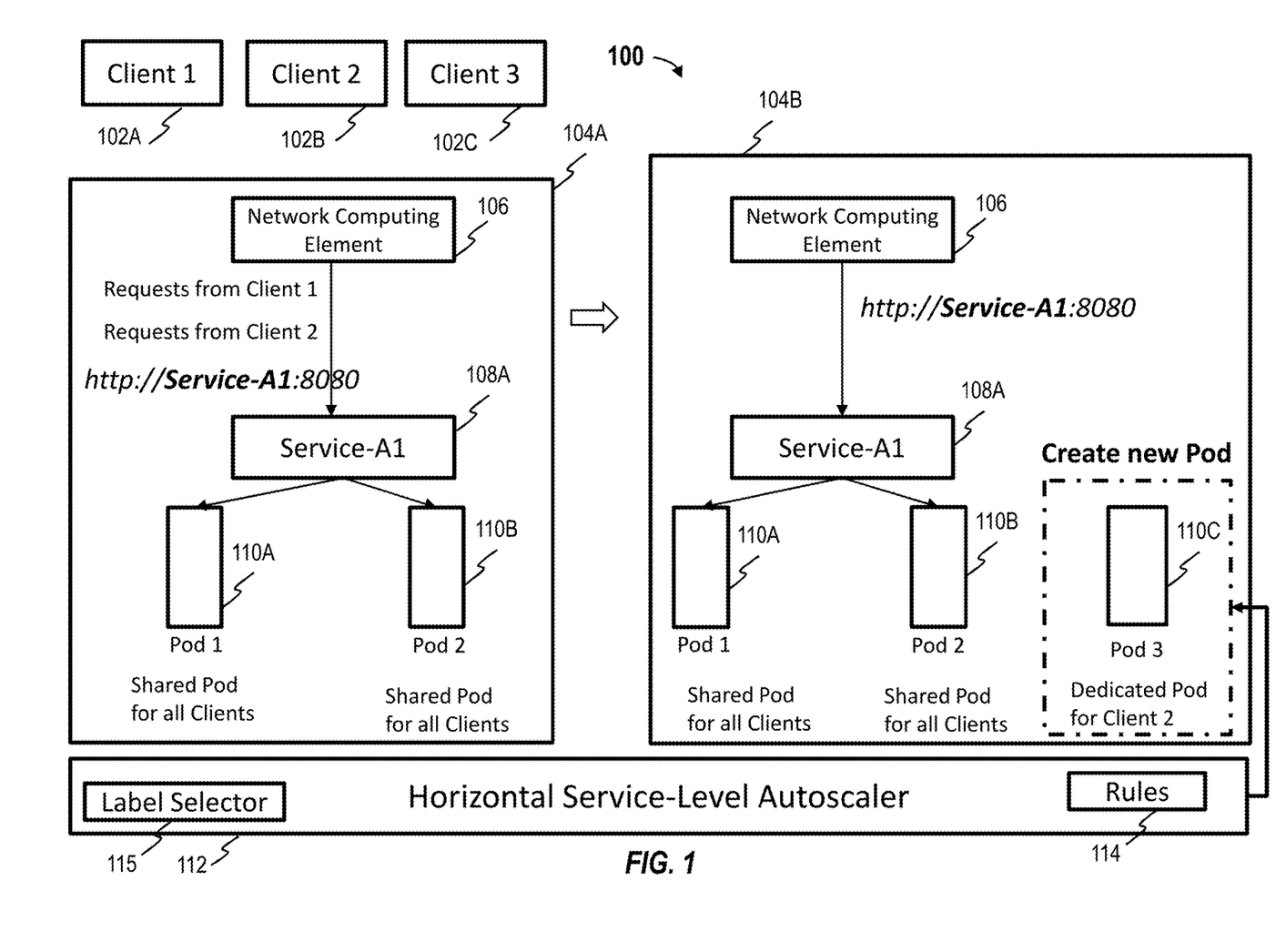
FIG. 1 depicts a block diagram of a system with a horizontal service-level autoscaler according to one or more embodiments of the present invention.

FIG. 1 depicts a high-level block diagram of an illustrative example of a system 100 with a horizontal service-level autoscaler 112. The system 100 is an example of a containerized-networked system. In the example of FIG. 1, multiple clients 102A, 102B, 102C can request interaction with a service 108A through a network computing element 106, such as a gateway. The service 108A can be mapped to two pods 110A, 110B through a label selector 115 for sharing by all clients 102A-102C. In a first system configuration 104A, the network computing element 106 may receive requests from client 102A and client 102B to interact with service 108A as a multi-tenant service to shared pods 110A, 110B. Pods 110A and 110B may provide access to resources, such as databases or network connections, and requests by each client 102A, 102B may result in different amounts of resources per client. In the example of FIG. 1, the service 108A may be accessible through network computing element 106 using a protocol, such as HTTP, to connect to service name Service-A1 through port 8080, for instance.

The horizontal service-level autoscaler 112 can monitor resource utilization and determine when horizontal autoscaling is needed based on rules 114. For example, the rules 114 can define one or more thresholds for scaling up the number of pods 110. For instance, each of the pods 110A, 110B may have a minimum and maximum number of connections or other parameters supported to access resources. Where a resource, such as memory, exceeds a threshold defined in the rules 114 for client 102B, the horizontal service-level autoscaler 112 can create a new pod 110C to support the higher resource needs of client 102B as depicted in a second system configuration 104B.

Figure 2:
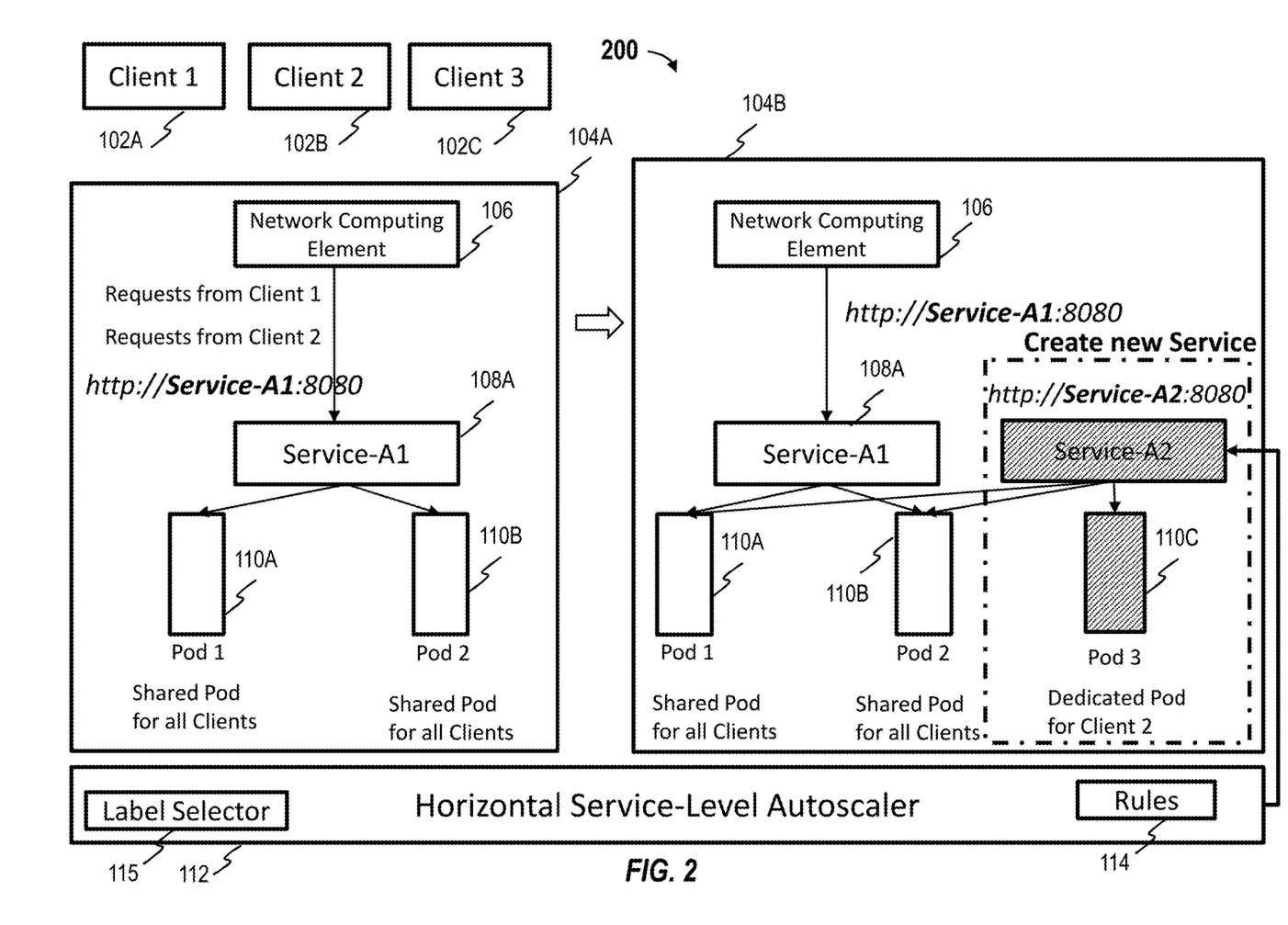
FIG. 2 depicts a block diagram of a system with a new service mapping according to one or more embodiments of the present invention.

The horizontal service-level autoscaler 112 can also create a new service 108B as a variation of service 108A in the second system configuration 104B as depicted in the example of FIG. 2 as system 200. The label selector 115 can bind the service 108B to pods 110A, 110B, 110C. The service 108B can be configured to provide the same functionality previously available to client 102B through service 108A but be dedicated to handling all requests for interactions by client 102B to pods 110A-110C. Further, pod 110C can be initially configured as a dedicated pod for client 102B, while pods 110A, 110B remain as shared pods for clients 102A and 102B. In order to make service 108B accessible, routing rules in the network computing element 106 can be updated to map requests from client 102B to service 108B as depicted in the example configuration of system 300 of FIG. 3. The update of the routing rules of the network computing element 106 can be initiated by the horizontal service-level autoscaler 112.

Figure 3:
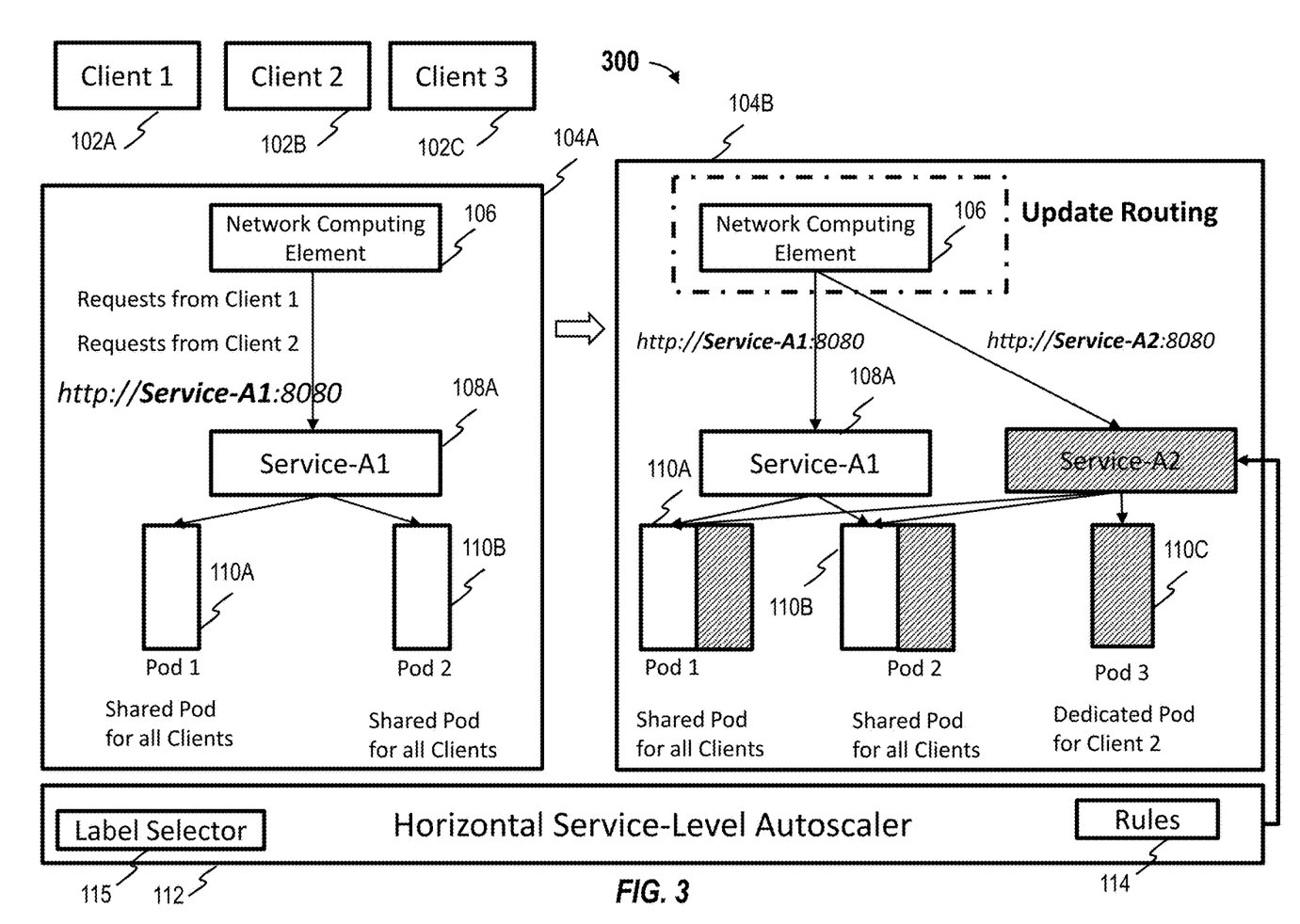
FIG. 3 depicts a block diagram of a system with updated routing for a new service mapping according to one or more embodiments of the present invention.

In the example of FIG. 3, the service 108B may be accessible through network computing element 106 using a protocol, such as HTTP, to connect to service name Service-A2 through port 8080, for instance. The clients 102A. 102B need not know about the internal distinction and separate addresses of the variations of the service (e.g., service A). The routing rules of the network computing element 106 can define client and service name pairs to continue adding more services as additional clients 102 request to interact with the service. For instance, a service ID of "service A" may include routing rules of client 102A requests sent to service 108A (e.g., service A1) and client 102B requests sent to service 108B (e.g., service A2). Scaling targets monitored by the horizontal service-level autoscaler 112 defined in rules 114 can include one or more of memory usage and processing resource usage. As new variations of service 108A are created with new pods 110, the routing rules of the network computing element 106 can continue to be updated.

Figure 4:
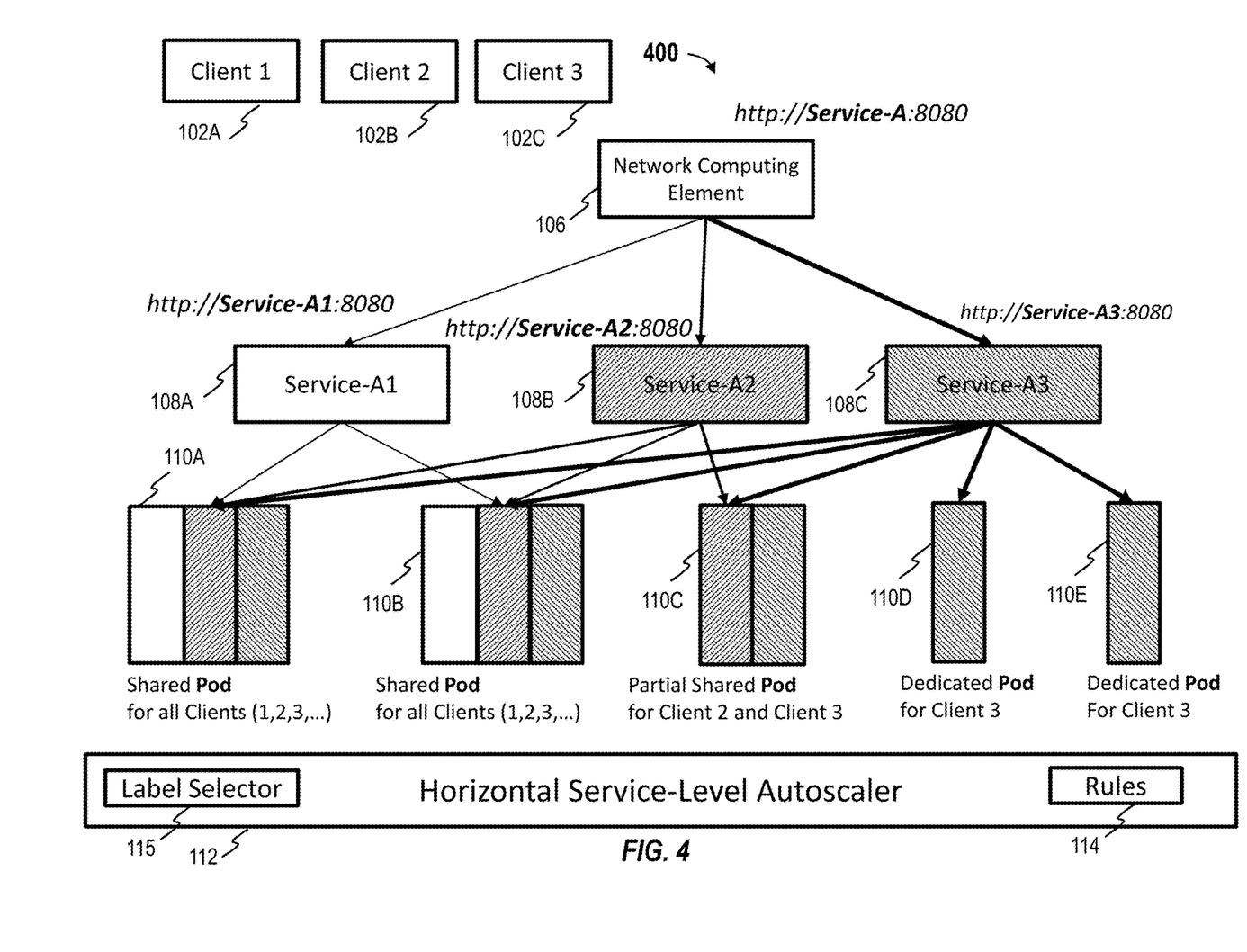
FIG. 4 depicts a block diagram of a system with multiple variations of a service mapped to multiple clients according to one or more embodiments of the present invention.

Turning now to FIG. 4, an example block diagram of a system 400 is shown with multiple variations of a service mapped to multiple clients, in accordance with one or more aspects of the disclosure. In system 400, the horizontal service-level autoscaler 112 has further expanded on the mapping of the configuration of system 300 of FIG. 3. Rules 114 can be used to determine that requests from client 102C result in resource demands that exceed the capacity of shared pods 110A and 110B, which may also be used by services 108A and 108B for clients 102A and 102B respectively. Further, the requests from client 102C may also result in resource demands of client 102B, resulting the service 108C being newly created as another variation of service 108A for client 102C. Pod 110C may be converted from a dedicated pod to a partially shared pod for clients 102B and 102C. The horizontal service-level autoscaler 112 can create new pods 110D, 110E as dedicated pods for the service 108C. The label selector 115 can bind pods 110A-110E to service 108C, and the routing rules of the network computing element 106 can be updated to create a new service mapping to accept subsequent requests from the client 102C that triggered creation of the new pods 110D, 110E and route requests from client 102C to service 108C. In the example of FIG. 4, the service 108C may be accessible through network computing element 106 using a protocol, such as HTTP, to connect to service name Service-A3 through port 8080, for instance. The clients 102A, 102B, 102C need not know about the internal distinction and separate addresses of the variations of the service.

Figure 5:
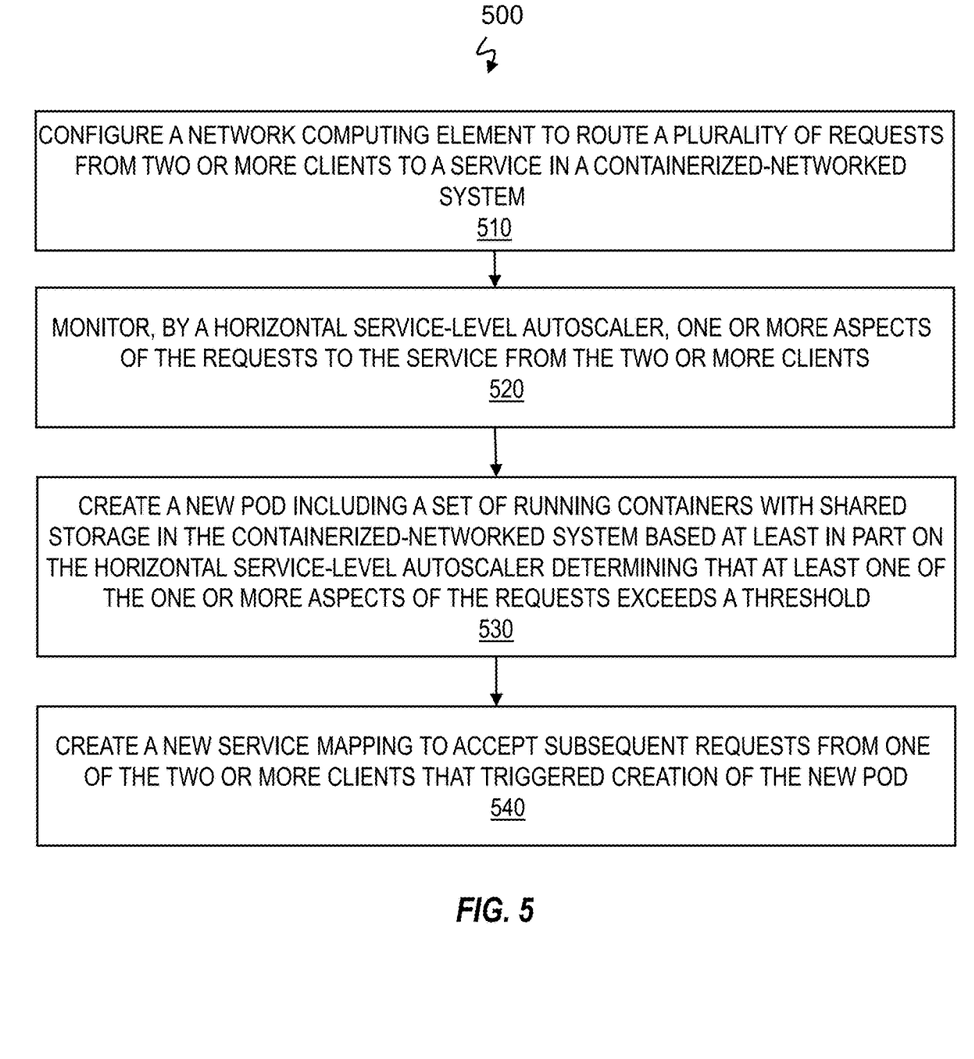
FIG. 5 depicts a flow diagram of a method of dynamic horizontal autoscaling for a multi-tenant service according to one or more embodiments of the present invention.

FIG. 5 is a flow diagram of a method 500 of dynamic horizontal autoscaling for a multi-tenant service, in accordance with one or more aspects of the disclosure. The method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 can be performed by the horizontal service-level autoscaler 112 of FIGS. 1-4. Accordingly, FIG. 5 is described with reference to FIGS. 1-4.

With reference to FIG. 5, method 500 illustrates example functions performed by various embodiments. Although specific function blocks ("blocks") are disclosed in method 500, such blocks are examples. That is, embodiments can perform various other blocks or variations of the blocks recited in method 500. The blocks in method 500 may be performed in an order different than presented, and not all of the blocks in method 500 may be performed. Further, method 500 can be expanded to include additional steps beyond those depicted in the example of FIG. 5, and one or more blocks can be combined or further subdivided.

Method 500 begins at block 510, where a network computing element 106 is configured to route a plurality of requests from two or more clients 102 to a service 108A in a containerized-networked system, such as system 100. At block 520, the horizontal service-level autoscaler 112 monitors one or more aspects of the requests to the service 108A from the two or more clients 102. At block 530, a new pod 110C, including a set of running containers with shared resources in the containerized-networked system, is created based at least in part on the horizontal service-level autoscaler 112 determining that at least one of the one or more aspects of the requests exceeds a threshold. For example, the new pod 110C can be created where client 102B uses or requests use of resources that exceed a predetermined threshold, such as an amount of memory, processing resources, network connection resources, and/or other such resources as defined in rules 114.

At block 540, a new service mapping is created to accept subsequent requests from one of the two or more clients 102 that triggered creation of the new pod 110C. For example, a new service 108B can be bound to pods 110A, 110B, 110C using label selector 115, and routing rules of the network computing element 106 can be updated to map requests from client 102C to service 108C. Horizontal scaling at a service level can continue to be performed for each new client 102 that accesses the network computing element 106 with resource requests that exceed a threshold. Multiple thresholds can be defined. For example, a first threshold can define when to scale the pods horizontally above the capacity of pods 110A and 110B, a second threshold can define when to scale the pods horizontally beyond the capacity of pods 110A, 110B, 110C, and a third threshold can define when to scale the pods horizontally beyond the capacity of pods 110A, 110B, 110C, 110D, 110E, and so forth.

One or more aspects of the requests can be checked with respect to a plurality of predefined rules (e.g., rules 114) based at least in part on one or more of memory usage and processing resource usage. The method 500 can also include using the label selector 115 to bind a relationship between the new service mapping and the new pod, such as binding service 108C with pods 110D and 110E in addition to existing pods 110A-110C. Routing rules in the network computing element 106 can be updated to map two or more clients 102 to two or more variations of the service 108 based at least in part on the new service mapping. At least one pod 110 can be shared by multiple clients 102 through multiple service mappings (e.g., pods 110A, 110B) and/or at least one pod 110 can be dedicated for a single client 102 (e.g., pods 110D, 110E).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
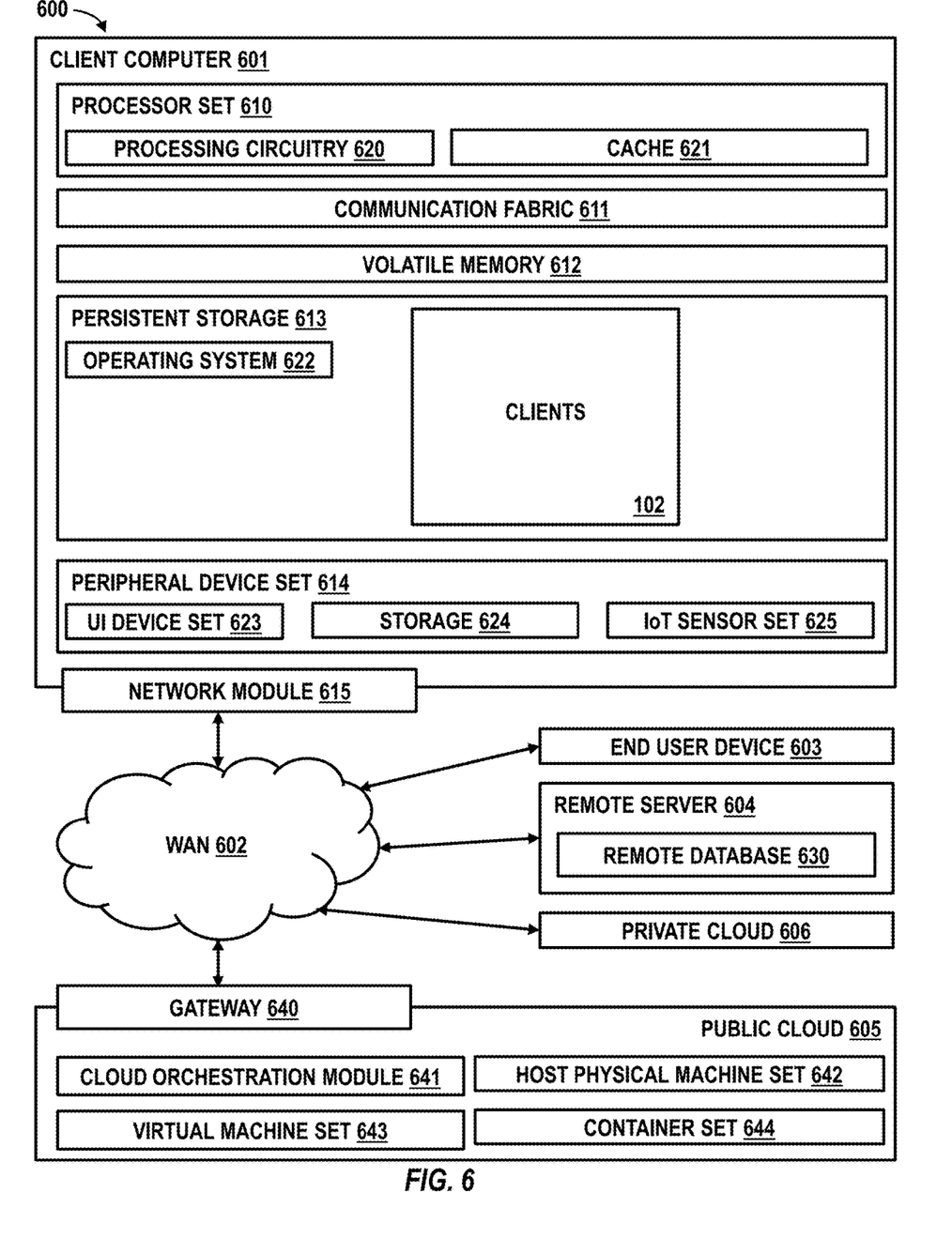
FIG. 6 depicts a block diagram of an example computing environment for use in conjunction with one or more embodiments of the present invention.

Computing environment 600 of FIG. 6 contains an example of an environment for the execution of at least some of the computer code involved in performing the inventive methods, such as method 500 of FIG. 5. The computing environment 600 can include other aspects as previously described, network computing element 106 and horizontal service-level autoscaler 112 of FIGS. 1-4. The computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and clients 102, as identified above), peripheral device set 614 (including user interface (UI), device set 623, storage 624, and Internet of Things (IOT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in persistent storage 613.

COMMUNICATION FABRIC 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface type operating systems that employ a kernel. The code included in horizontal service-level autoscaler 112 of FIGS. 1-4 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602. The gateway 640 can be an example of the network computing element 106 of FIGS. 1-4. The horizontal service-level autoscaler 112 can be implemented within the remote server 604, the public cloud 605, the private cloud 606, and/or elsewhere with the computing environment 600.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:

configuring a network computing element to route a plurality of requests from two or more clients to a service in a containerized-networked system, wherein the two or more clients use the same service address to request the service through the network computing element, and the network computing element uses routing rules to route each of the client requests to a particular client-specific variation of a plurality of client-specific variations of the service each having a different service name that represents the service;

monitoring, by a horizontal service-level autoscaler, one or more aspects of the requests to the service from the two or more clients that are received through the network computing element and routed by the network computing element to a first variation of the service using a first service name of the service, wherein the first variation of the service is mapped to a first pod that is a shared pod of all of the two or more clients;

creating a new pod comprising a set of running containers with shared resources in the containerized-networked system, the creating based at least in part on the horizontal service-level autoscaler determining that at least one of the one or more aspects of the requests exceeds a threshold;

creating a new service mapping comprising a second variation of the service having a second service name that maps to the first pod and to the new pod, wherein the new pod is a dedicated pod of the client that triggered creation of the new pod, wherein the new pod may be converted from the dedicated pod to a partially shared pod that is shared by more than one of the clients and shared by fewer than all of the clients; and updating routing rules in the network computing element by mapping the client that triggered creation of the new pod to the second service name instead of the first service name, thereby causing the network computing element to route subsequent requests from the client that triggered creation of the new pod to the second variation of the service instead of the first variation of the service.

2. The computer-implemented method of claim 1, wherein the one or more aspects of the requests are checked with respect to a plurality of predefined rules based at least in part on one or more of memory usage and processing resource usage.

3. The computer-implemented method of claim 1, further comprising: using a label selector to bind a relationship between the new service mapping and the new pod.

4. The computer-implemented method of claim 1, further comprising: continuing to perform horizontal scaling at a service level for each new client that accesses the network computing element.

5. A system comprising:
a memory; and
a processing device coupled to the memory, the processing device configured to execute instructions to:
    configure a network computing element to route a plurality of requests from two or more clients to a service in a containerized-networked system, wherein the two or more clients use the same service address to request the service through the network computing element, and the network computing element uses routing rules to route each of the client requests to a particular client-specific variation of a plurality of client-specific variations of the service each having a different service name that represents the service;
    monitor, by a horizontal service-level autoscaler, one or more aspects of the requests to the service from the two or more clients that are received through the network computing element and routed by the network computing element to a first variation of the service using a first service name of the service, wherein the first variation of the service is mapped to a first pod that is a shared pod of all of the two or more clients;
    create a new pod comprising a set of running containers with shared resources in the containerized-networked system, the creating based at least in part on the horizontal service-level autoscaler determining that at least one of the one or more aspects of the requests exceeds a threshold;
    create a new service mapping comprising a second variation of the service having a second service name that maps to the first pod and to the new pod, wherein the new pod is a dedicated pod of the client that triggered creation of the new pod, wherein the new pod may be converted from the dedicated pod to a partially shared pod that is shared by more than one of the clients and shared by fewer than all of the clients; and
    update routing rules in the network computing element by mapping the client that triggered creation of the new pod to the second service name instead of the first service name, thereby causing the network computing element to route subsequent requests from the client that triggered creation of the new pod to the second variation of the service instead of the first variation of the service.

6. The system of claim 5, wherein the one or more aspects of the requests are checked with respect to a plurality of predefined rules based at least in part on one or more of memory usage and processing resource usage.

7. The system of claim 5, wherein the processing device and the memory are further configured to use a label selector to bind a relationship between the new service mapping and the new pod.

8. The system of claim 5, wherein the processing device and the memory are further configured to continue to perform horizontal scaling at a service level for each new client that accesses the network computing element.

9. A computer program product comprising a computer readable storage medium having program instructions embodied therewith, the program instructions executable by one or more processors to cause the one or more processors to perform operations comprising:
    configuring a network computing element to route a plurality of requests from two or more clients to a service in a containerized-networked system, wherein the two or more clients use the same service address to request the service through the network computing element, and the network computing element uses routing rules to route each of the client requests to a particular client-specific variation of a plurality of client-specific variations of the service each having a different service name that represents the service;
    monitoring, by a horizontal service-level autoscaler, one or more aspects of the requests to the service from the two or more clients that are received through the network computing element and routed by the network computing element to a first variation of the service using a first service name of the service, wherein the first variation of the service is mapped to a first pod that is a shared pod of all of the two or more clients;
    creating a new pod comprising a set of running containers with shared resources in the containerized-networked system, the creating based at least in part on the horizontal service-level autoscaler determining that at least one of the one or more aspects of the requests exceeds a threshold;
    creating a new service mapping comprising a second variation of the service having a second service name that maps to the first pod and to the new pod, wherein the new pod is a dedicated pod of the client that triggered creation of the new pod, wherein the new pod may be converted from the dedicated pod to a partially shared pod that is shared by more than one of the clients and shared by fewer than all of the clients; and
    updating routing rules in the network computing element by mapping the client that triggered creation of the new pod to the second service name instead of the first service name, thereby causing the network computing element to route subsequent requests from the client that triggered creation of the new pod to the second variation of the service instead of the first variation of the service.

10. The computer program product of claim 9, wherein the one or more aspects of the requests are checked with respect to a plurality of predefined rules based at least in part on one or more of memory usage and processing resource usage.

11. The computer program product of claim 9, wherein the operations further comprise: using a label selector to bind a relationship between the new service mapping and the new pod; and updating routing rules in the network computing element to route the two or more clients to two or more variations of the service based at least in part on the new service mapping.

12. The computer program product of claim 9, wherein the operations further comprise: continuing to perform horizontal scaling at a service level for each new client that accesses the network computing element.

* * * * *